United States Patent

[11] 3,627,259

[72] Inventor George C. Williams
 4123 E. 45th St., Tulsa, Okla. 74135
[21] Appl. No. 883,885
[22] Filed Dec. 10, 1969
[45] Patented Dec. 14, 1971

[54] CAM SEAL BUTTERFLY VALVE
 6 Claims, 10 Drawing Figs.

[52] U.S. Cl.................................................. 251/163,
 251/188, 251/308
[51] Int. Cl................................................ F16k 5/14
[50] Field of Search............................................ 251/160,
 161, 162, 163, 164, 187, 188

[56] References Cited
 UNITED STATES PATENTS
 2,383,549 8/1945 Hilker .......................... 251/164 X
 2,879,798 3/1959 Anderson ..................... 251/164 X
 3,180,362 4/1965 Muller .......................... 251/188 X
 3,342,453 9/1967 Soila ............................ 251/188 X Primary Examiner—Harold W. Weakley
Attorney—Head & Johnson ABSTRACT: This invention relates to an improved butterfly valve. More particularly, the invention relates to a butterfly valve having a body with an axial flow passageway therethrough and a stem opening intersecting the fluid passageway, a stem member rotatably axially displaceably supported in the stem opening, a valve disc positioned in the flow passageway and movable between a closed position in which the plane of the disc is perpendicular to the axis of the flow passageway and an opened position in which the plane of the disc is parallel the axis of the flow passageway, a stem-actuating means external of the body for rotating and axially displacing the stem member, and attachment means securing the stem member to the disc whereby the rotation of the valve stem rotates the disc member between opened and closed positions and the axial displacement of the valve stem moves the disc into and out of sealing engagement with the valve body.

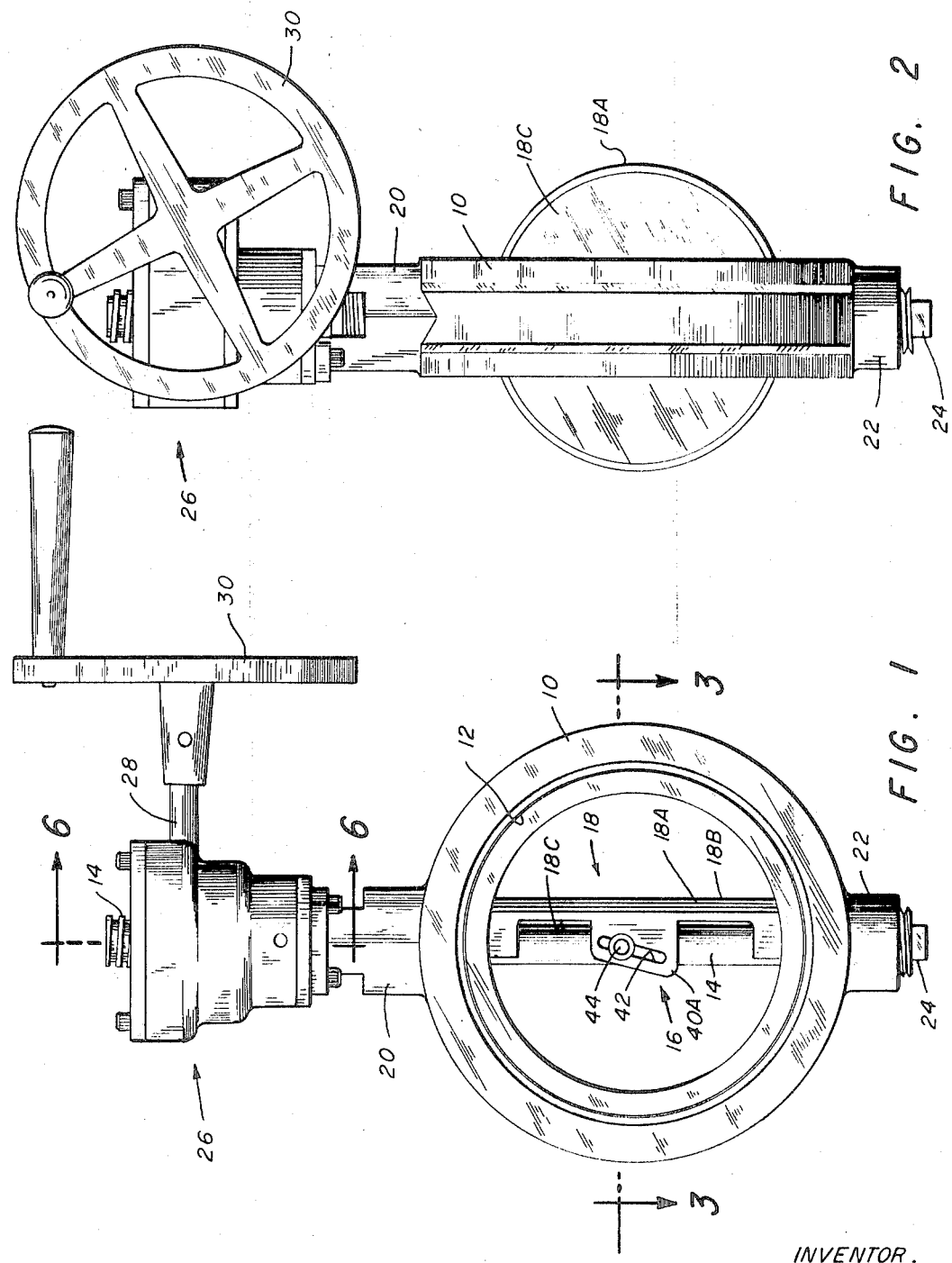

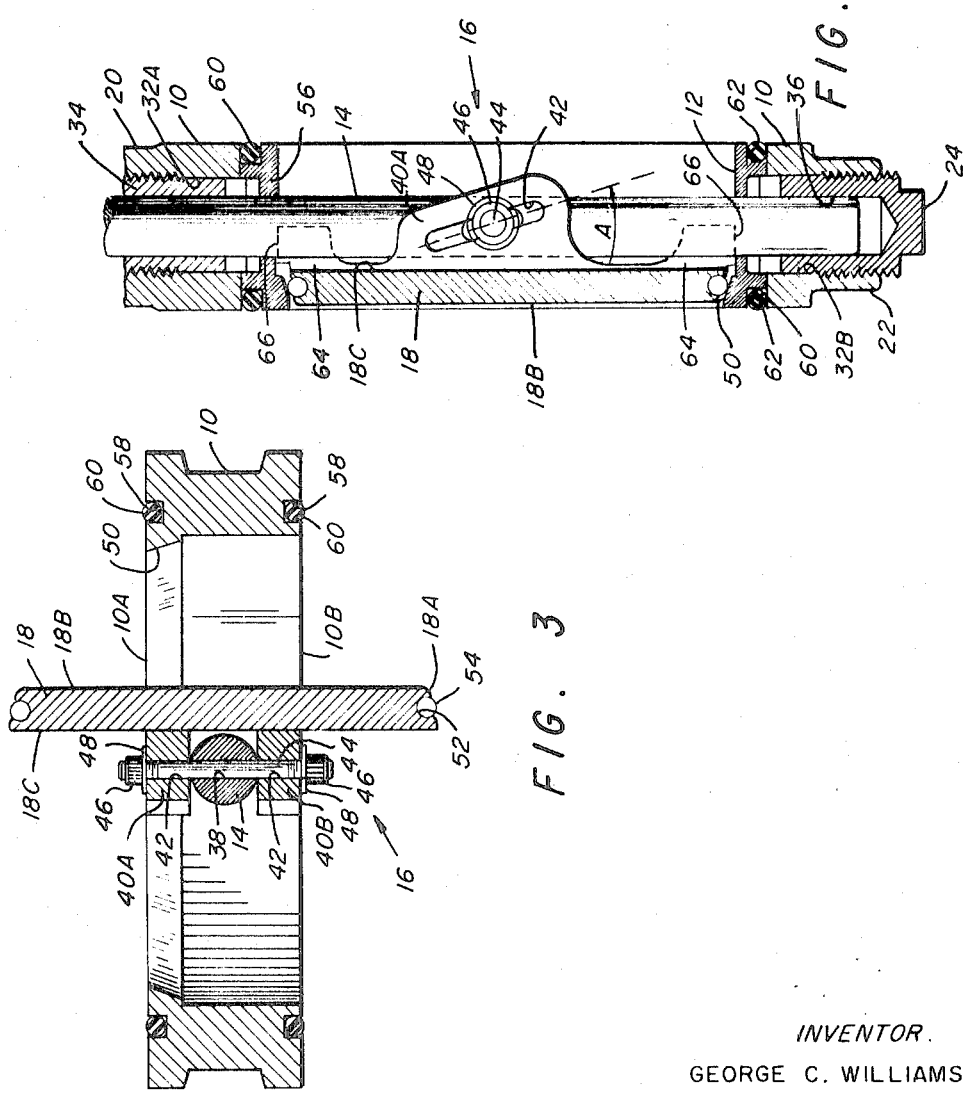

INVENTOR.
GEORGE C. WILLIAMS

BY *Head & Johnson*

ATTORNEYS

PATENTED DEC 14 1971 3,627,259

INVENTOR.
GEORGE C. WILLIAMS
BY
*Head & Johnson*
ATTORNEYS

CAM SEAL BUTTERFLY VALVE

CROSS-REFERENCE

This application is not related to any pending United States or foreign patent application.

BACKGROUND AND OBJECTS OF THE INVENTION

Butterfly valves are well-known devices used to control the flow of fluid and gases. Generally, a butterfly valve includes a body having a flow passageway therethrough defined, in part, by a peripheral sealing surface. A cylindrical disc supported by a stem in the flow passageway is moved such that when the plane of the disc is perpendicular to the axis of the flow passageway the periphery of the disc engages the sealing surface in the body and closes the valve against the fluid or gas flow. When the disc is rotated such that the plane thereof is parallel the flow passageway axis, fluid flows to either side of the disc through the valve.

Butterfly valves are favorably accepted in industry because of their simplicity, dependability and economy. However, butterfly valves have been utilized primarily for relatively low pressures because the normal type of butterfly valve sealing is accomplished by the close tolerance fit of the disc as it is rotated into position to engage the valve seat. If the fit of the disc against the seat is too tight, excessive torque is encountered in opening and closing the valve. If accurate machine tolerances are observed in the initial construction of a butterfly valve, wear between the sealing surfaces may eventually result in a decrease in pressure surfaces may eventually result in a decrease in pressure contact between the sealing surfaces thus reducing the pressure-holding characteristics of the valve.

This invention has for its main object the provision of a butterfly valve including advantages of economy, simplicity and dependability over known types of butterfly valves but, in addition, including the provision of means of positively engaging the valve disc with the valve body sealing surface when the valve is in the closed position. More particularly, an object of this invention is to provide a butterfly valve including means of positively moving the valve disc into contact with the valve seat as the valve is moved into closed position so as to achieve higher pressure-handling capabilities and, in addition, to compensate for wear which may occur in the sealing components of the valve and thereby insure longer service life of the valve.

Another object of this invention is to provide a butterfly valve in which the valve disc is positively moved into sealing engagement with the body-sealing surface as the disc is moved into closed position and is moved away from contact with the body-sealing surface as the disc is moved towards the opened position so as to substantially reduce the torque involved in opening and closing the valve but at the same time maintain high pressure-retaining characteristics of the valve.

These general objects as well as more specific objects of the invention will be apparent from the description and claims, taken in conjunction with the drawings which show an embodiment of the invention.

BRIEF DESCRIPTION OF THE DRAWINGS

FIG. 1 is an external end view of a valve embodying the principles of the invention showing the valve in the opened position.

FIG. 2 is an external side view of the valve of FIG. 1.

FIG. 3 is a cross-sectional view of the valve of this invention taken along the line 3—3 of FIG. 1, the disc being in the opened position.

FIG. 4 is a cross-sectional view of the body portion of the valve showing the disc in the closed position.

FIG. 5 is a rearward view of the valve stem and valve disc of the invention with the disc in the opened position, and showing portions of the valve body in cross section.

DETAILED DESCRIPTION OF THE PREFERRED EMBODIMENT

Figure 7:
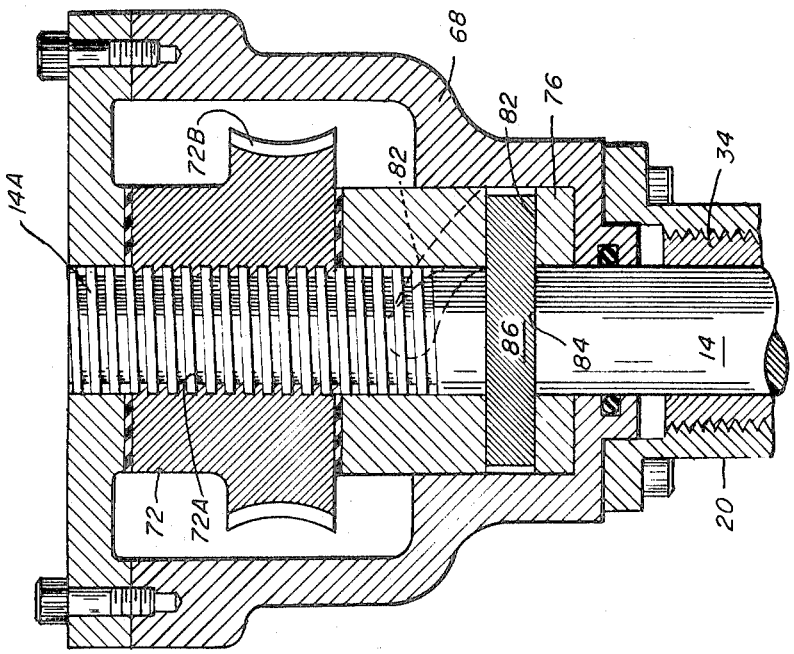
FIG. 7 is a cross-sectional view taken along the line 7—7 of FIG. 6.

Referring now to FIGS. 1 and 2, a butterfly valve illustrating an embodiment of the invention is shown. The valve includes a body 10 having a flow passageway 12 therethrough. The body 10 is illustrated as being of the wafer type, that is, the body is designed to be inserted between the parallel opposing faces of flanges. This arrangement has the advantage that the valve can easily be removed from a line and replaced if necessary and this is a commonly used expedient in industry. It is to be understood, however, that the invention is not limited to the wafer-type body 10 as illustrated but may be included in any type of body arrangement including integral flanges, threaded end portions and other means for attaching the body to other piping components.

Rotatably and axially positioned in the flow passageway 12 is a valve stem 14. Affixed to the stem 14 by an attachment means, generally indicated by the numeral 16, is a valve disc 18 which is of generally planar configuration having a peripheral circumferential sealing surface 18A, a forward face 18B and a rearward face 18C.

In the open position, as shown in FIGS. 1 and 2, the disc 18 is oriented such that the plane of the disc is parallel to the axis of the flow passageway 12 providing free passage of fluid or gas to either side of the disc. When the disc is in the closed position, the plane of the disc 18 is perpendicular to the axis of flow passageway 12 and the periphery 18A engages, at the full circumference thereof, the fluid passageway 12 to close the flow of fluid or gas through the valve.

Body 10 includes an integral upper stem boss portion 20 and a lower stem boss portion 22, the lower boss portion being closed by plug 24. Affixed to the upper stem boss portion 20 is a stem-actuating means, generally indicated by the numeral 26. In the illustrated arrangement, the stem-actuating means has an actuating shaft 28 extending therefrom which has a handwheel 30 affixed to the outer end.

The valve described to this point may be said to be a typical butterfly valve except for the novel features of this invention which are directed primarily to the attachment means 16 and the stem-actuating means 26, both of which features will be described now in greater detail.

First, attachment means 16 will be better understood by reference to FIGS. 3, 4 and 5. As shown in FIGS. 4 and 5, the body portion 10 includes in the upper stem boss portion 20 an upper stem-receiving opening 32A and in the lower boss portion 22 a lower stem-receiving opening 32B, openings 32A and 32B being in axial alignment. The axis of openings 32A and 32B is perpendicular the flow passageway 12 in the valve body. In the illustrated embodiment the upper stem-receiving opening 32A is threaded in part and includes an upper stem bushing 34 which forms a bearing for the stem 14. Plug 24 is threaded on the exterior surface and engages a threaded portion of lower stem-receiving opening 32B, plug 24 having a cylindrical interior surface 36 which forms a bearing surface for the lower end of stem 14. Stem 14 is rotatably supported and at the same time is axially displaceable relative to the valve body 10. The provisions of bushings 34 and plug member 24 are optional and it can be seen that, in the simplest arrangement, stem openings 32A and 32B in the valve body may directly receive the stem 14 or, in the alternative, the bearing and seal arrangement for rotatably and axially supporting the stem 14 relative to the body 10 may vary in many ways.

The stem 14 includes a perpendicular pin-receiving opening 38 (see FIG. 3) therein intermediate the ends. Extending from the rearward face 18C of the disc member are spaced, paralleled boss portions 40A and 40B. The boss portions extend to either side of stem 14. Each of the boss portions 40A and 40B has a longitudinal slot 42 therein. The longitudinal slots 42 of each of the boss portions 40A and 40B extend in a common plane which, as shown in FIG. 4, has an angle A relative to the rearward face 18C of disc member 18. Received in slots 42 and in pin-receiving opening 38 is a guide pin 44 having a nut 46 and a washer 48 at each end thereof, exterior of the boss portions 40A and 40B. It can be seen that the rotation of stem 14 results in the transfer of such rotary motion from guide pin 44 to boss portions 40A and 40B and thus to the disc 18. At the same time the axial displacement of stem member 14 causes a movement of the disc 18 in a direction towards or away from the stem according to the directions of movement of the stem.

In the arrangement of FIG. 3, the valve body 10 is of a configuration providing an integral annular valve seat 50. The disc 18 is provided with a groove 52 in the peripheral surface 18A, the groove having an O-ring 54 therein. When the stem 14 is rotated to move the disc 18 toward the closed position, O-ring 54 engages the annular valve seat surface 50 to close the valve.

In the arrangement of FIGS. 4 and 5, the valve body includes a removable body seat member 56 which provides the annular valve-sealing surface 50. Another variation between the embodiment of FIG. 3 compared to that of FIGS. 4 and 5 is that in FIG. 3 the valve body includes grooves 58 in the body flange faces, each of which grooves 58 receive an O-ring 60 to seal against flange faces (not shown) by which the valve body is held in position in the piping system. In the arrangement of FIGS. 4 and 5, the seat member 56 includes annular notches 62 which receive the O-ring 60. Annular notches 62 could also be placed in the valve body immediately adjacent the removable seat member 56. The valve body arrangements of FIGS. 3 and 4 and 5 accomplish the same purpose; however, this illustrates the variety of ways in which a valve embodying the principles of this invention may be constructed.

Referring now to FIGS. 3, 4 and 5, it can be seen that when the valve stem 14 is displaced axially upwardly the guide pin 44 moves in longitudinal slot 42 to move the disc 18 towards the valve stem 14 and away from the annular valve seat 50, and when the stem 14 is displaced axially downwardly the action of guide pin 44 in longitudinal slot 42 is to force the valve disc 18 towards the annular valve seat 50 to close the valve.

As is best shown in FIGS. 4 and 5, the disc 18 preferably includes rearwardly extending guide bosses 64 at the top and bottom thereof, each of which pairs extend more or less in a semicircular configuration around the stem 14. The guide bosses 64 provide semicircular flat bearing surfaces 66 on each end thereof which bear against the interior of body 10 and, in the configuration wherein a removable seat member 56 in utilized as in FIGS. 4 and 5, the bearing surfaces 66 bear against such removable seat member. The guide bosses 64 hold disc 18 so that it may be rotated by stem 14 and may be advanced to and away from the annular sealing surface 50. Thus FIGS. 3, 4 and 5 disclose an attachment means 16 to rotatably position the valve disc 18 and at the same time displace the valve disc towards and away from the valve seat in response to rotational and axial displacement of valve stem 14.

Figure 6:
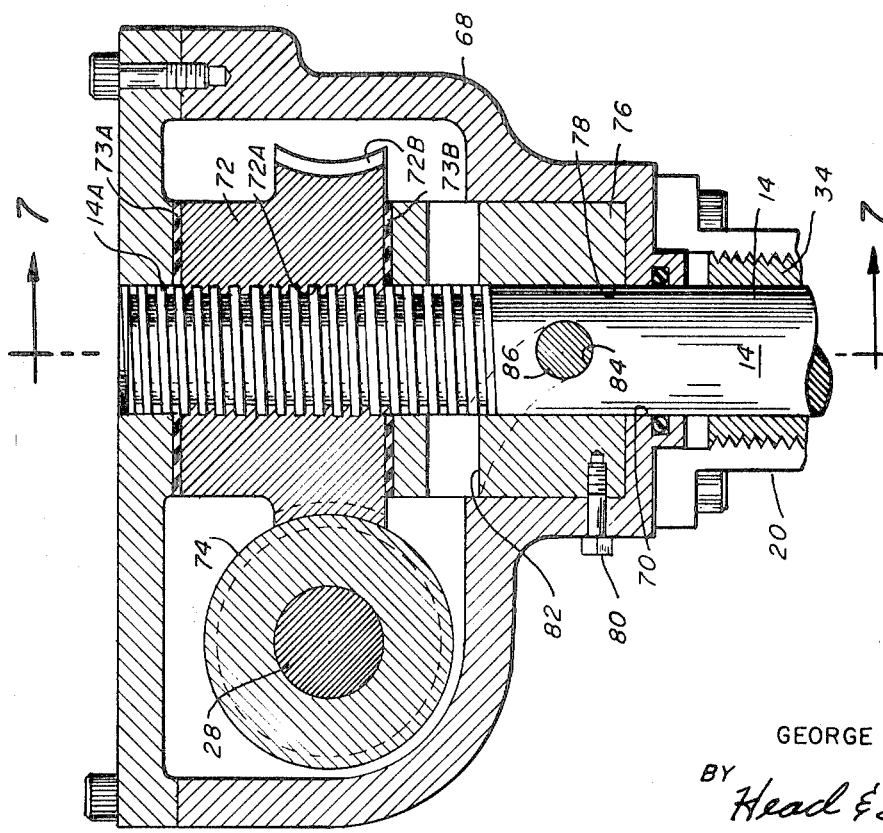
FIG. 6 is a cross-sectional view taken along the line 6—6 of FIG. 1 showing the interior construction of the valve stem actuating means of this invention.

Referring now to FIGS. 6 and 7, a means illustrating the principles of this invention is shown which serves to rotatably and axially position the valve stem 14. A housing 68 having an opening 70 therein receiving stem 14 is supported to the upper end of the valve upper boss portion 20. The upper end of stem 14 is externally threaded at 14A. A drive gear 72 has internal threads 72A which engage the external threaded portion 14A of the stem and has external circumferential toothed portion 72B. Washers 73A and 73B prevent lateral displacement of gear 72. Supported to the housing 68 is a worm gear 74 which is received on and affixed to stem actuating shaft 28. Worm gear 74 engages the external gear portion 72B of the drive gear 72. Thus by the rotation of the stem-actuating shaft 28 (as by means of the handwheel 30 shown in FIGS. 1 and 2) worm gear 74 is rotated and thereby drive gear 72 is rotated. The rotation of drive gear 72 relative to stem 14 causes the stem 14 to axially displace.

In the lower portion of housing 68, below drive gear 72, is a cam member 76 having openings 78 therein receiving stem 14. The cam member 76 is nonrotatably supported relative to housing 68, such as by means of bolt 80. Cam member 76 includes a spiraled cam slot 82 therein. Stem 14 includes an opening 84 therethrough which receives a guide pin 86 which extends within the cam groove 82 in the cam member 76. The action of the guide pin 86 against the cam gear 76 as the stem 14 is axially moved relative to the cam member 76 is to cause the rotation of the stem. The axial movement of the stem 14 from its full upper to its full lower position relative to cam member 76 results in the stem 14 being rotated 90°.

Thus it can be seen, in reference to FIGS. 6 and 7, that the rotation of shaft 28, such as by means of the handwheel 30, rotates worm gear 74 which in turn rotates drive gear 72. Such rotation acts upon the external threaded portion 14A of the valve stem causing the axial displacement thereof. Such axial displacement forces guide pin 84 against the cam groove 82 in cam member 76 causing the rotation of the stem member. By this means the stem member is both rotated and axially displaced by the means of handwheel 30.

Figure 8:
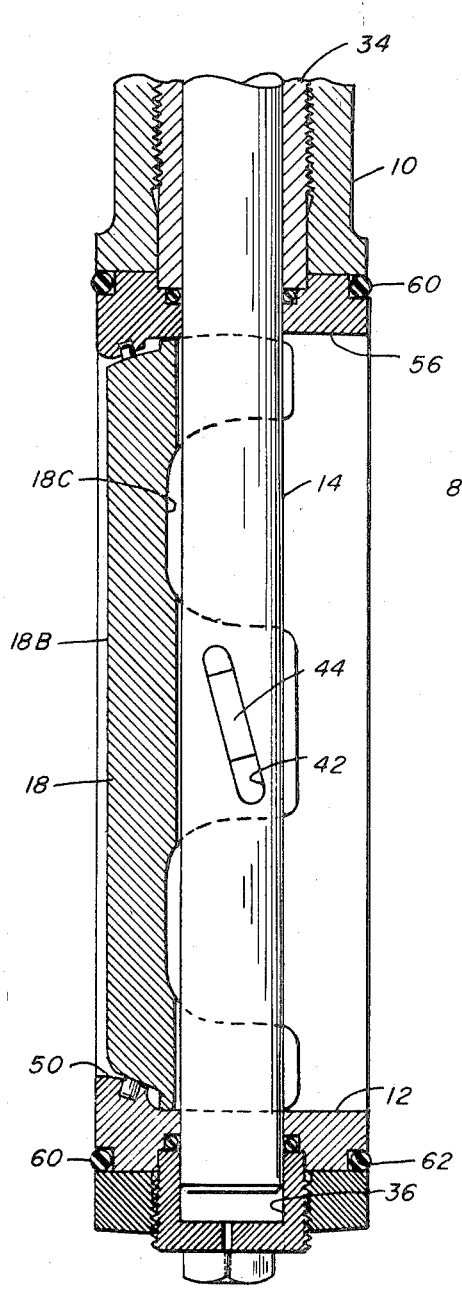
FIG. 8 is a cross-sectional view similar to that of FIG. 4 but showing an alternate arrangement for the disc attachment means.
Figure 9:
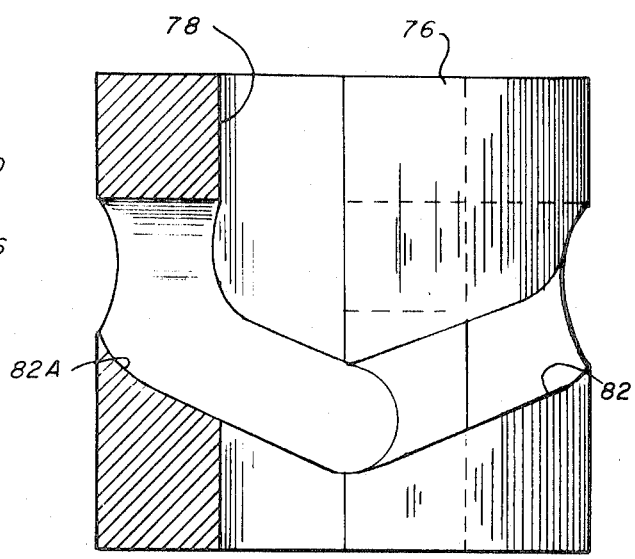
FIG. 9 is an enlarged partially cross-sectional view of the cam member as shown in FIGS. 6 and 7.

FIG. 9 is an enlarged view of the cam member of the invention. It can be seen that any means of axially displacing the stem 14 relative to the cam member 76 will cause the rotation of the stem member 14. An obvious alternate arrangement includes means such as a hydraulic or pneumatic actuator directly coupled for axial movement of the stem 14 relative to the cam member 76 as a means of opening and closing the valve. FIG. 8 shows an alternate embodiment of the invention in which the guide pin 44 is of a rectangular configuration having parallel flat sides which engages the slot 42. The function of the rectangular configured pin 44 of FIG. 8 is the same as the round pin 44 of FIGS. 3, 4 and 5.

OPERATION

Assume the valve is in the closed position as shown in FIG. 4. To open the valve the operator rotates handwheel 30 in the appropriate direction rotating worm gear 74 (see FIG. 6) which in turn rotates drive gear 72. The action of the internal threads of drive gear 72 on the external threaded portion 14A of the valve stem is to cause the stem to axially raise. The upward movement of stem 14 produces two functions. First, as the stem is raised the guide pin 44 moves in the longitudinal slot 42 in the disc boss portions 40A and 40B to pull the disc 18 towards the stem, that is, away from the body annular sealing surface 50. Thus, the upward movement of the stem unseats the valve disc 18 from the body annular sealing surface 50. A second result of the upward movement of stem 14 is to cause the guide pin 86 to move in the spiraled cam slot 82 in cam member 76. This causes the rotation of the stem 14, moving the disc 18 towards the opened position as shown in FIG. 3. As the disc 18 is moved towards the opened position, it is concurrently moved away from sealing contact with the valve annular sealing surface 50.

To close the valve the procedure is reversed. Handwheel 30 is rotated in the opposite direction reversing the rotation of drive gear 72 and moving the stem 14 downwardly. The downward movement moves the pin 44 in slot 42 of the attachment means 16 to move the valve disc 18 back in the direction of the sealing surface 50. Concurrently the downward movement of the guide pin 86 on cam slot 82 rotates the stem 14 in the direction of closing of the valve. As the valve closes, the disc peripheral sealing surface 18A is forced into positive sealing engagement with the valve annular sealing surface 50.

Figure 10:
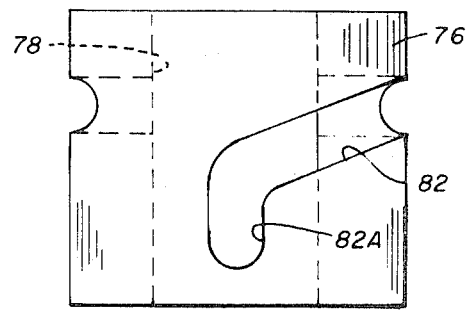
FIG. 10 is a partially cross-sectional view of the cam member as shown in FIG. 9 but showing an alternate configuration of the cam groove.

It can be seen that the configuration of the cam slot 82 may be varied in a number of ways. In an alternate embodiment shown in FIG. 10, the slot 82 provides a portion 82A which is in the plane of a valve stem 14, such portion being that which pin 86 occupies when the valve is in the closed position. This lower straight portion 82A of the cam slot has an important function. By this means as the valve is first moved from the closed position as shown in FIG. 4 the stem 14 travels upwardly for a given length before rotation of the disc is initiated. This upward travel causes the disc 18 to be unseated by movement away from the body annular sealing surface 50 prior to rotation of the disc. Contrarily, as the valve is closed the lower straight portion 82A of the cam groove means that the valve is first rotated to the closed position and then, when in such closed position, is axially advanced into positive sealing engagement with the valve body. By this preferred configuration of cam slot 82 the disc is moved into and out of positive sealing engagement with the valve body without requiring the sealing surfaces to frictionally engage or at least in an arrangement in which the friction is substantially reduced. This feature eliminates wear on the sealing surfaces and prolongs the like of the valve. In addition, such arrangement eliminates the requirement that the valve components be manufactured and assembled to a high degree of accuracy to obtain the necessary seal pressure since the function of the valve achieves a positively obtained sealing closure by means to a great extent independent the life manufacturing tolerances. The provision of means for positively moving the seat into sealing engagement with the valve body means that a much higher pressure relationship is attainable between the valve body and the valve seat so that a butterfly valve having increased effectiveness in closing against high pressures is obtained.

Many alternate arrangements of the components of the valve described herein may be made within the scope of the invention. For instance, washers 73A and 73B may be replaced by thrust bearing. The disc seal 54 is shown and described as an O-ring and this could be replaced by any suitable sealing means such as a square ring, T-ring, etc. Cam member 76 is shown as being external of the valve body 10, while the cam member could be positioned internally of the body by redesigning boss portion 20. It is manifest that many other changes may be made in the details of construction and the arrangement of components without departing from the spirit and scope of this disclosure.

What is claimed:

1. A butterfly valve comprising:
   a body having an axial flow passageway therethrough and a stem opening perpendicularly intersecting the flow passageway, said flow passageway being defined in part by an annular valve seat;
   a stem member rotatably and axially displaceably supported in said body stem opening and extending within said flow passageway;
   a valve disc member of generally planar configuration positioned in said flow passageway an movable between a closed position in which the plane of the disc is perpendicular the axis of the flow passageway and an opened position in which the plane of the disc is parallel the axis of the flow passageway, the valve disc having a forward face and a sealing face, the valve disc member being defined in part by a peripheral sealing surface on said forward face which sealably engages said body annular valve seat when the disc is in closed position;
   stem-actuating means external of said body for rotating and axially displacing said stem member;
   spaced-parallel boss portions extending rearwardly and perpendicularly from said disc member rearward surface and to either side of said stem member, said boss portions having a slot therein each aligned with the other and each in the same plane inclined at an angle to the planar disc member; and
   a guide pin, said stem member having an opening therethrough perpendicular the stem member axis, said guide pin being received in said opening in said stem member an slidably received in each of said slots in said disc member boss portions.

2. A butterfly valve according to claim 1 wherein said means of rotating and axially displacing said stem member comprises:
   cam means operably positioned between said stem member and said valve body for the rotation of said stem member 90° in one rotational direction when said stem member is axially displaced in the direction of said valve body and for rotation of said stem member 90° in the opposite rotational direction when said stem member is axially displaced in the direction away from said valve body.

3. A valve comprising:
   a body having an axial flow passageway therethrough and a stem opening intersecting the flow passageway, said flow passageway being defined in part by an annular valve seat;
   a stem member rotatably and axially displaceably supported in said body stem opening and extending within said flow passageway;
   a valve member positioned in said flow passageway and movable between a closed position in which the valve member closes said passageway and an opened position in which said passageway is opened, the valve member having a forward portion and a rearward portion, the valve member being defined in part by a peripheral sealing surface on said forward portion which sealably engages said body annular valve seat when the member is in closed position;
   stem-actuating means external of said body for rotating and axially displacing said stem member;
   spaced-parallel boss portions extending rearwardly and perpendicular from said valve member rearward portion and to either side of said stem member, each of said boss portions having a slot therein each aligned with the other and each in the same plane inclined at an angle to the axis of the stem member; and
   a guide pin, said stem member having an opening therethrough perpendicular the stem member axis, said guide pin being received in said opening in said stem member and slidably received in each of said slots in said valve member boss portions whereby the rotation of said valve stem rotates said valve member, and the axial displacement of said valve stem in one direction displaces said valve member away from said stem member and toward said body valve seat and the displacement of said valve stem in the opposite direction displaces said valve member towards said stem member and away from said valve body.

4. A valve according to claim 3 wherein said means of rotating and axially displacing said stem member comprises:
   cam means operably positioned between said stem member and said valve body for the rotation of said stem member 90° in one rotational direction when said stem member is axially displaced in the direction of said valve body and for rotation of said stem member 90° in the opposite rotational direction when said stem member is axially displaced in the direction away from said valve body.

5. A valve according to claim 3 wherein said means of rotating and axially displacing said stem member comprises:
   a cam member having an opening therein rotatably receiving said stem member exterior of said body, said cam member being nonrotatably supported to said body, said cam member having a cam slot therein;
   a guide pin, said stem member having a guide pin opening therein radial the axis thereof and external of said body, said guide pin being received in said guide pin opening and by said cam slot in said cam member; and
   means of axially displacing said stem member, said cam member cam slot being configured such that the action of said guide pin by said cam slot rotates said stem member 90° in one rotational direction when said stem member is axially displaced in the direction of said valve body and rotates said stem member 90° in the opposite direction when said stem is axially displaced in the direction away from said valve body.

6. A butterfly valve according to claim 5 wherein said means of axially displacing said stem member comprises:

a drive gear having an internally threaded axial opening therein, said stem member having an externally threaded portion external of said body threadably receiving said drive gear;

housing means secured to said valve body and rotatably receiving said stem member, said housing means rotatably and nonaxially displaceably supporting said drive gear; and means of rotating said drive gear.

* * * * *